United States Patent
Hobl et al.

(10) Patent No.: US 8,240,759 B2
(45) Date of Patent: Aug. 14, 2012

(54) SEAT ASSEMBLY HAVING A TRIM COVER

(75) Inventors: Ralf Hobl, Karlshuld (DE); Kevin John Withers, Breitenbrunn (DE)

(73) Assignee: Lear Corporation, Southfield, MI (US)

( * ) Notice: Subject to any disclaimer, the term of this patent is extended or adjusted under 35 U.S.C. 154(b) by 163 days.

(21) Appl. No.: 12/824,636

(22) Filed: Jun. 28, 2010

(65) Prior Publication Data
US 2011/0049948 A1    Mar. 3, 2011

(30) Foreign Application Priority Data
Aug. 27, 2009    (DE) .......................... 10 2009 039 153

(51) Int. Cl.
*A47C 31/02*    (2006.01)
(52) U.S. Cl. ............... 297/218.1; 297/218.2; 297/218.3; 297/218.5; 297/452.59
(58) Field of Classification Search ............... 297/218.1, 297/218.3, 218.5, 452.59, 218.2
See application file for complete search history.

(56) References Cited

U.S. PATENT DOCUMENTS

| | | | | |
|---|---|---|---|---|
| 3,628,830 A * | 12/1971 | Mitjans | ..................... | 297/452.59 |
| 4,296,964 A * | 10/1981 | Haack | ..................... | 297/218.1 |
| 4,352,524 A * | 10/1982 | Crosby | ..................... | 297/452.59 |
| 4,455,047 A | 6/1984 | Watanabe | | |
| 4,579,389 A | 4/1986 | Shimbori et al. | | |
| 4,740,035 A * | 4/1988 | Kazaoka et al. | ....... | 297/218.1 X |
| 4,772,070 A * | 9/1988 | Leto et al. | ............... | 297/218.1 X |
| 5,718,478 A * | 2/1998 | Allison | ................... | 297/218.1 X |
| 5,733,001 A * | 3/1998 | Roberts | ..................... | 297/218.1 |
| 5,964,017 A * | 10/1999 | Roberts | ................... | 297/218.1 X |
| 6,371,562 B1 | 4/2002 | Yoshimura et al. | | |
| 6,394,542 B2 * | 5/2002 | Potisch et al. | ......... | 297/218.3 X |
| 6,406,093 B1 | 6/2002 | Miotto et al. | | |
| 6,612,648 B1 * | 9/2003 | Hashiguchi | ................ | 297/218.1 |
| 7,255,404 B2 * | 8/2007 | Neale | ..................... | 297/218.1 X |
| 7,469,968 B2 * | 12/2008 | Hazlewood | .......... | 297/452.59 X |
| 7,481,489 B2 * | 1/2009 | Demick | ..................... | 297/218.1 |
| 7,568,761 B2 * | 8/2009 | Mashimo | ................ | 297/218.1 X |
| 7,891,735 B2 * | 2/2011 | Oku | ......................... | 297/218.3 |
| 7,901,002 B2 * | 3/2011 | Mashimo | ................... | 297/218.3 |
| 7,946,649 B2 * | 5/2011 | Galbreath et al. | ......... | 297/218.1 |
| 8,079,640 B2 * | 12/2011 | Kim et al. | ............... | 297/218.1 X |
| 2002/0117882 A1 * | 8/2002 | Takezawa | ................... | 297/218.1 |
| 2007/0148427 A1 | 6/2007 | Yumoto et al. | | |
| 2009/0146475 A1 | 6/2009 | Rutty | | |

(Continued)

FOREIGN PATENT DOCUMENTS
DE    1909235 A1    9/1970
(Continued)

OTHER PUBLICATIONS

German Patent & Trademark Office, Office Action for the Corresponding German Patent Application No. 10 2009 039 153.3 mailed Jun. 7, 2010.

*Primary Examiner* — Rodney B White
(74) *Attorney, Agent, or Firm* — Brooks Kushman P.C.

(57) ABSTRACT

A seat assembly having a trim cover assembly disposed proximate a cushion. The trim cover assembly includes a first portion and a second portion. The second portion has a first end coupled to the first portion, a second end coupled to the frame, and an elastomeric layer that exerts a tensile force.

20 Claims, 6 Drawing Sheets

U.S. PATENT DOCUMENTS

| | | |
|---|---|---|
| 2009/0152909 A1 | 6/2009 | Andersson |
| 2010/0148551 A1* | 6/2010 | Nguyen et al. ............. 297/218.3 |

FOREIGN PATENT DOCUMENTS

| | | |
|---|---|---|
| DE | 8715700 U1 | 3/1988 |
| DE | 10209185 C1 | 6/2003 |
| DE | 102005005218 A1 | 8/2006 |
| DE | 102005013613 A1 | 9/2006 |
| DE | 60122086 T2 | 11/2006 |
| GB | 562585 A | 7/1944 |
| JP | 2001010387 A | 1/2001 |
| JP | 2007282839 A | 11/2007 |

* cited by examiner

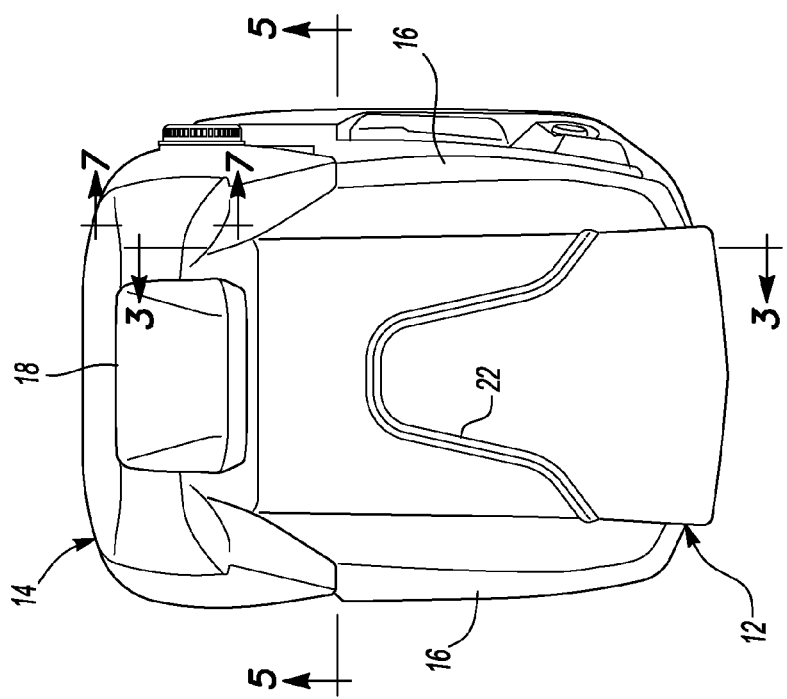
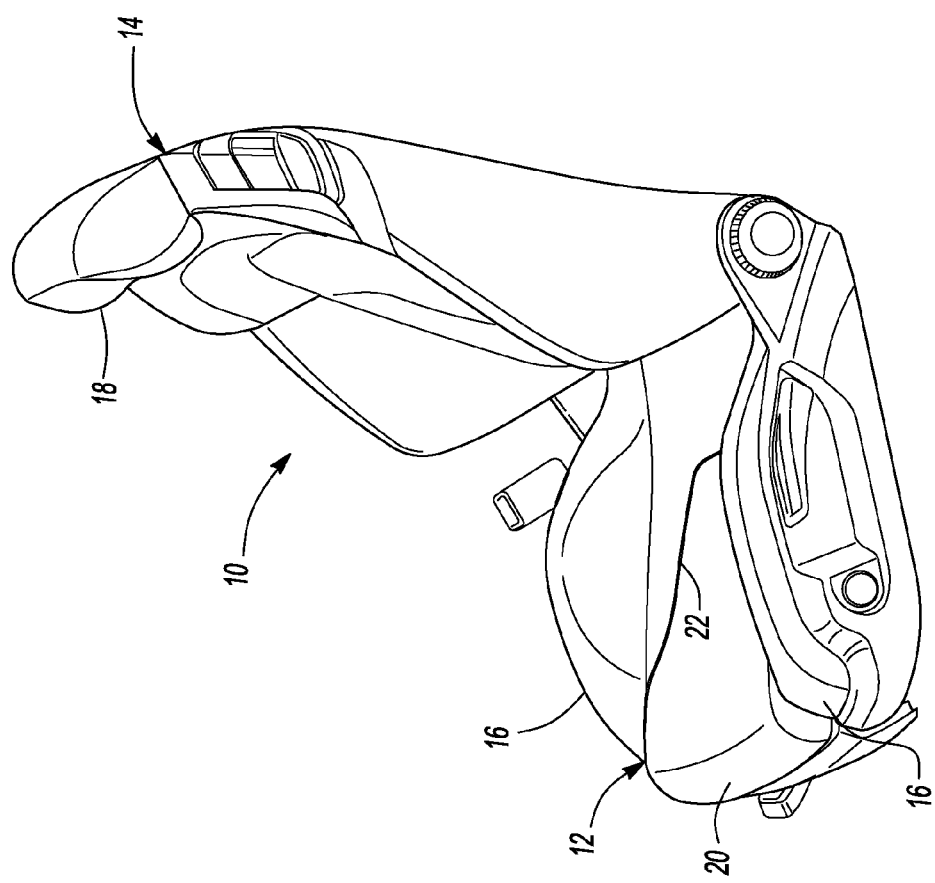

SEAT ASSEMBLY HAVING A TRIM COVER

CROSS-REFERENCE TO RELATED APPLICATIONS

This application claims foreign priority benefits under 35 U.S.C. §119(a)-(d) to DE 10 2009 039 153.3, filed Aug. 27, 2009, which is hereby incorporated by reference in its entirety.

BACKGROUND

Field of the Invention

The present invention relates to a seat assembly having a trim cover.

SUMMARY OF THE INVENTION

In at least one embodiment, a seat assembly is provided. The seat assembly includes a frame, a cushion disposed proximate the frame, and a trim cover assembly disposed proximate the cushion. The trim cover assembly includes a first portion having a plurality of layers and a second portion. The second portion has a first end coupled to the first portion and a second end coupled to the frame. The second portion has a cover and an elastomeric layer. The elastomeric layer is detached from the cover between the first and second ends.

In at least one embodiment, a seat assembly is provided. The seat assembly includes a seat cushion and a cover assembly. The seat cushion has a first surface and a second surface disposed opposite the first surface. The cover assembly includes a trim cover assembly disposed proximate the first surface and a sling coupled to the trim cover assembly and disposed proximate the second surface. The sling provides a tensile force that stretches the trim cover assembly.

In at least one other embodiment, a seat assembly is provided. The seat assembly includes first and second bolster cushions and a bolster cover assembly. The bolster cover assembly includes a first bolster trim cover disposed on the first bolster, a second bolster trim cover disposed on the second bolster, and a bolster sling coupled to the first and second trim cover bolsters. The bolster sling biases the first and second bolster trim covers are toward each other in response to a sufficient load force.

BRIEF DESCRIPTION OF THE DRAWINGS

FIG. 1 is a perspective view of a seat assembly.

FIG. 2 is a top view of the seat assembly of FIG. 1.

DETAILED DESCRIPTION

Figure 3:
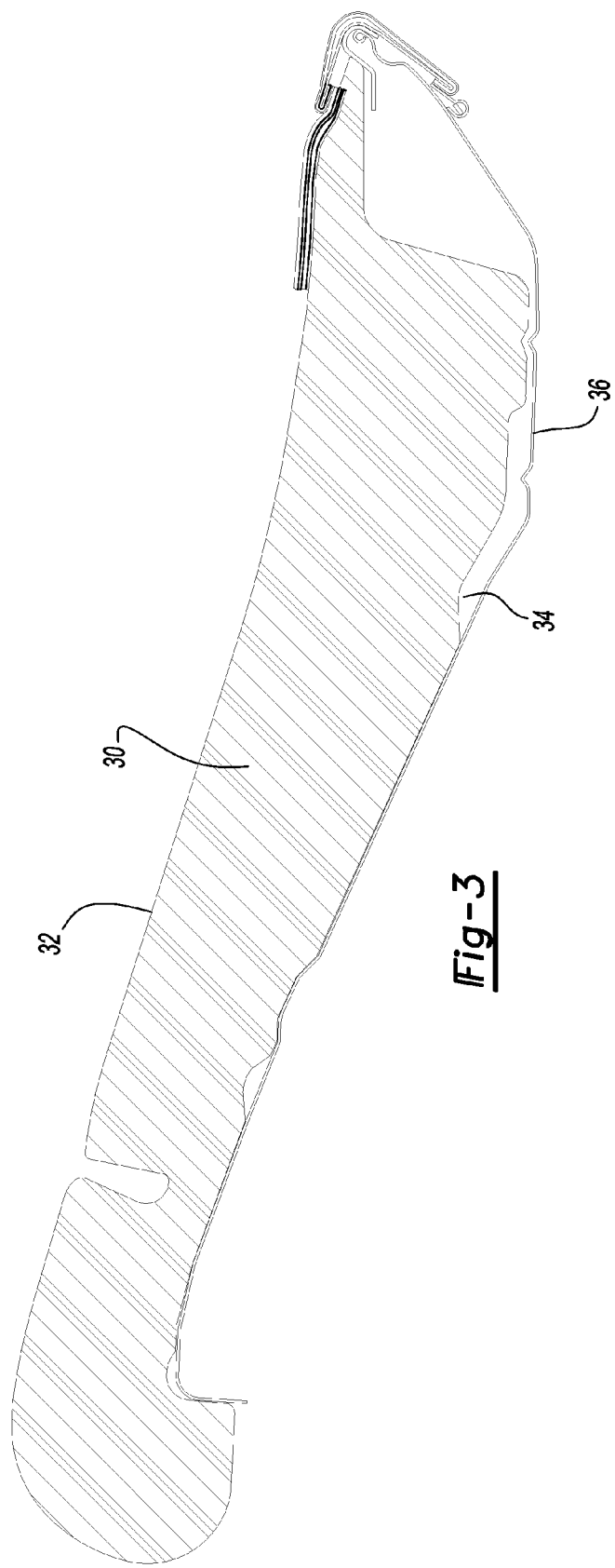
FIG. 3 is a fragmentary side section view of the seat assembly along section line 3-3.

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. In addition, any or all features from one embodiment may be combined with any other embodiment. Therefore, specific structural and functional details disclosed herein are not to be interpreted as limiting, but merely as a representative basis for the claims and/or as a representative basis for teaching one skilled in the art to variously employ the present invention.

Referring to FIGS. 1 and 2, an exemplary seat assembly 10 is shown. The seat assembly 10 may be configured for use in a vehicle, such as a motor vehicle like a car or truck. In addition, the seat assembly 10 may also be provided for non-vehicular applications.

The seat assembly 10 may include a seat bottom 12 and a seat back 14. The seat bottom 12 may be configured to be mounted on a support surface, such as a floor pan of a vehicle. The seat bottom 12 may include a plurality of side bolsters 16 that generally extend along opposing sides of the seat bottom 12 and from the seat back 14. The seat back 14 may be pivotally disposed on the seat bottom 12 and may include a head restraint assembly 18.

The seat bottom 12 and seat back 14 may each include a trim cover assembly 20 that comprises at least a portion of an exterior surface of the seat assembly 10. As such, the trim cover assembly 20 may provide a surface that is contacted by a seat occupant. The trim cover assembly 20 may include one or more decorative features 22, such as a groove, logo, or contoured surface. Since the trim cover assembly 20 provides a visible seating surface it may be desirable that the trim cover remain under tension to inhibit creasing, wrinkling and/or bulging that may degrade aesthetic appearance and/or reduce seating comfort.

Referring to FIG. 3, a portion of the seat bottom 12 having a trim cover assembly 20 is shown in more detail. Although the trim cover assembly 20 will primarily be described in reference to the seat bottom 12, the trim cover assembly may also be employed on a seat back 14 or other portions of a seat assembly 10.

The trim cover assembly 20 may be disposed proximate a cushion 30. The cushion 30 may be made of any suitable material, such as foam. The cushion 30 may include a first surface 32 and a second surface 34 that may be disposed opposite the first surface 32. The cushion 30 may be directly or indirectly supported by a frame 36. For example, the second surface 34 may face towards or be disposed on the frame 36.

The frame 36 may provide at least a portion of a support structure for the seat assembly 10. The frame 36 may be made of any suitable material, such as a metal or metal alloy. In at least one embodiment, the trim cover assembly 20 may be attached to the frame 36 in one or more locations as will be discussed in more detail below.

Figure 4:
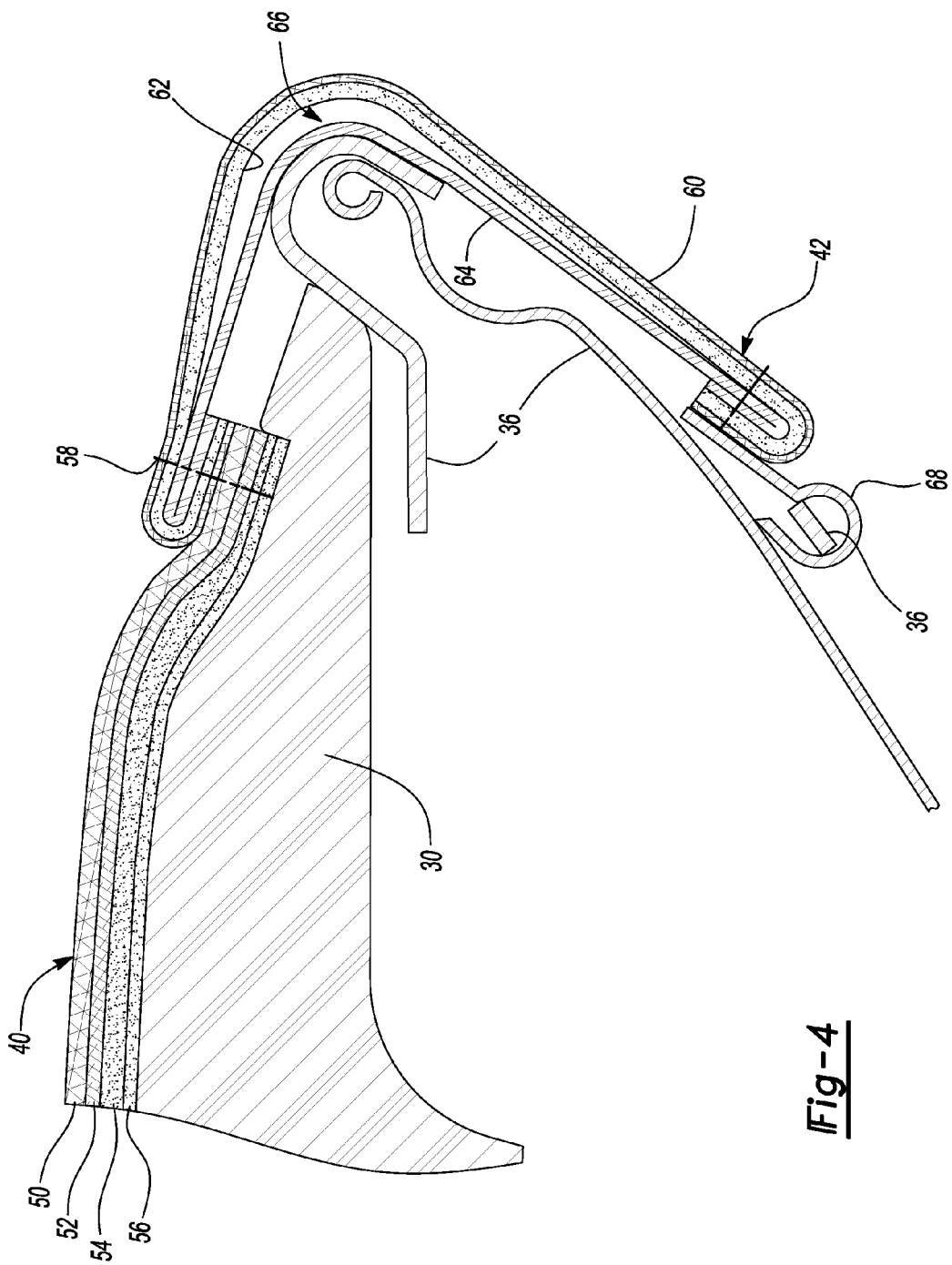
FIG. 4 is a magnified section view of a portion of the seat assembly shown in FIG. 3.

Referring to FIG. 4, a portion of the trim cover assembly 20 is shown in more detail. In FIG. 4, the trim cover assembly 20 includes a first portion 40 and a second portion 42.

The first portion 40 may include a plurality of layers. For example, the first portion may include a first layer 50, a second layer 52, a third layer 54, and a fourth layer 56. The present invention also contemplates that one or more layers may be omitted or repositioned in alternate embodiments. In at least one embodiment, the second, third and fourth layers 52, 54, 56 may be provided as a laminate that is applied to the first layer 50 and may be heat activated to adhere or bond one or more layers together.

The first layer 50 may provide at least a portion of an exterior or seating surface of the seat assembly 10. The first layer 50 may be made of any suitable material or materials, such as leather, vinyl, or fabric.

The second layer 52 may be disposed between the first and third layers 50, 54. For instance, opposing surfaces of the second layer 52 may directly contact the first and third layers, 50, 54, respectively. The second layer 52 may inhibit stretching of the first layer 50 while providing a desired level of flexibility. More specifically, the second layer 52 may help inhibit plastic deformation of the first layer 50. The second layer 52 may include a fabric laminate that includes a fabric material and a polymeric material, such as a copolyester thermoadhesive like Web 9L8 made by Protechnic or a copolyamide such as Spunfab PA1801.

The third layer 54 may be disposed between the second and fourth layers 52, 56. For instance, opposing surfaces of the third layer 54 may directly contact the second and fourth layers 52, 56, respectively. The third layer 54 may be made of a material that provides cushioning and/or enhances occupant comfort, such as foam.

The fourth layer 56 may be disposed adjacent to or in direct contact with the third layer 54. In addition, the fourth layer 56 may contact the cushion 30. The fourth layer 56 may be made of a material that provides cushioning and/or enhances occupant comfort, such as a fleece material.

The second portion 42 may be disposed adjacent to the first portion 40. For example, the second portion 42 may extend from the first portion 40. The first and second portions 40, 42 may overlap such that the second portion 42 is positioned above the first portion 40 or vice versa. In addition, the first and second portions 40, 42 may be positioned end to end. The first and second portions 40, 42 may be coupled to each other in any suitable manner, such as by heat bonding or fusing, with an adhesive, by mechanical attachment, or combinations thereof. In FIG. 4, the first and second portions 40, 42 are shown mechanically attached with stitching 58.

The second portion 42 may include a plurality of layers. Moreover, one or more layers of the second portion 42 may differ from those of the first portion 40. In the embodiment shown, the second portion 42 includes a cover layer 60, a backing layer 62, and a tension layer 64.

The cover layer 60 may provide an external surface of the second portion 42. The cover layer 60 may be made of any suitable material or materials, such as leather, vinyl, or fabric.

The backing layer 62 may be provided adjacent to the cover layer 60. The backing layer 62 may be made of any suitable material, such as a foam or another material that provides cushioning and/or reinforcement. In at least one embodiment, the backing layer 62 may be laminated or attached to the cover layer 60 in any suitable manner, such as by heat bonding or fusing, with an adhesive, by mechanical attachment, or combinations thereof.

One or more tension layers 64 may be disposed proximate the cover and/or backing layers 60, 62. The tension layer 64 may exert a tensile force that helps provide localized tension upon the first portion 50. The tension layer 64 may be made of any suitable material or materials, such as with an elastomeric material like rubber. The tension layer 64 may be attached to the cover and/or backing layers 60, 62 near ends of the tension layer 64 and may be detached between the ends of the tension layer 64. As such, a gap 66 may be provided between the tension layer 64 and cover and/or backing layers 60, 62. The tension layer 64 may be attached to the cover and/or backing layers 60, 62 in any suitable manner, such as by heat bonding or fusing, with an adhesive, by mechanical attachment, or combinations thereof. In the embodiment shown, the cover and backing layers 60, 62 wrap around end portions of the tension layer 64 and are shown attached by stitching. In addition, the tension layer 64 may contact a portion of the seat assembly 10, such as the frame 36, between the ends of the second portion 42 to help stretch the tension layer the second layer 64, which may thereby help modulate the tensile force exerted on the first portion 40.

Figure 5:
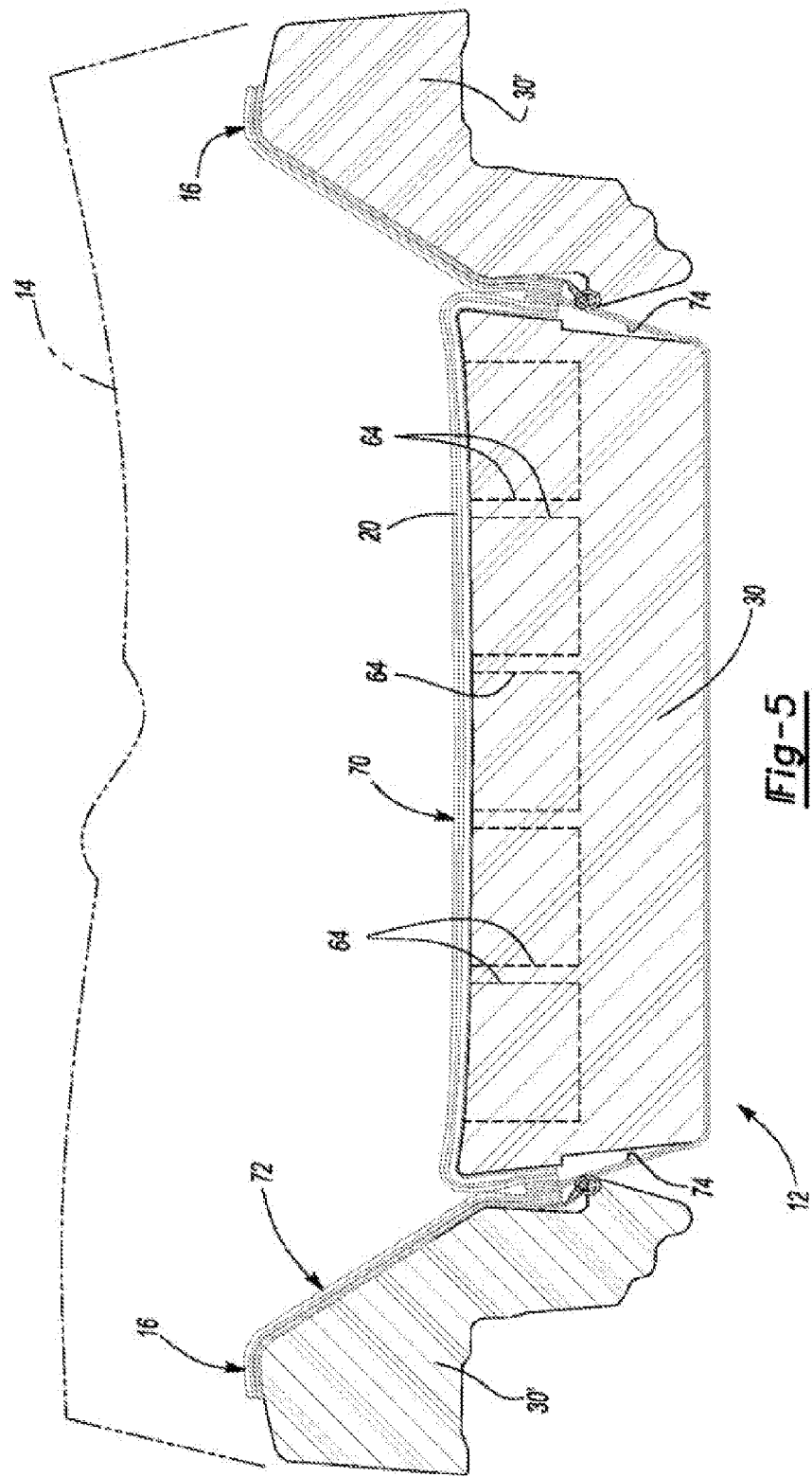
FIG. 5 is a fragmentary front section view of the seat bottom along section line 5-5.

In at least one embodiment, a plurality of tension layers 64 may be provided, such as is shown in FIG. 5. In FIG. 5, multiple tension layers 64 are shown in phantom. The tension layers 64 may extend substantially parallel to each other and may be spaced apart from each other to provide tensile force while providing gaps between the tension layers 64 that accommodate angular flexing of the second portion 42. In at least one embodiment, the tension layers 64 may be approximately 60 mm in length.

Referring again to FIG. 4, an end of the second portion 42 may be coupled to the frame 36 or other fixation point in any suitable manner. For instance, an attachment feature 68 may be provided proximate an end of the second portion 42 that is disposed opposite the end that is coupled to the first portion 40. The attachment feature 68 may couple the second portion 42 to a portion of the seat assembly 10, such as the frame 36. In the embodiment shown, the attachment feature 70 is configured as a hook. The attachment feature 70 may be coupled to the second portion 42 in any suitable manner, such as with by heat bonding or fusing, with an adhesive, by mechanical attachment, or combinations thereof.

Figure 6:
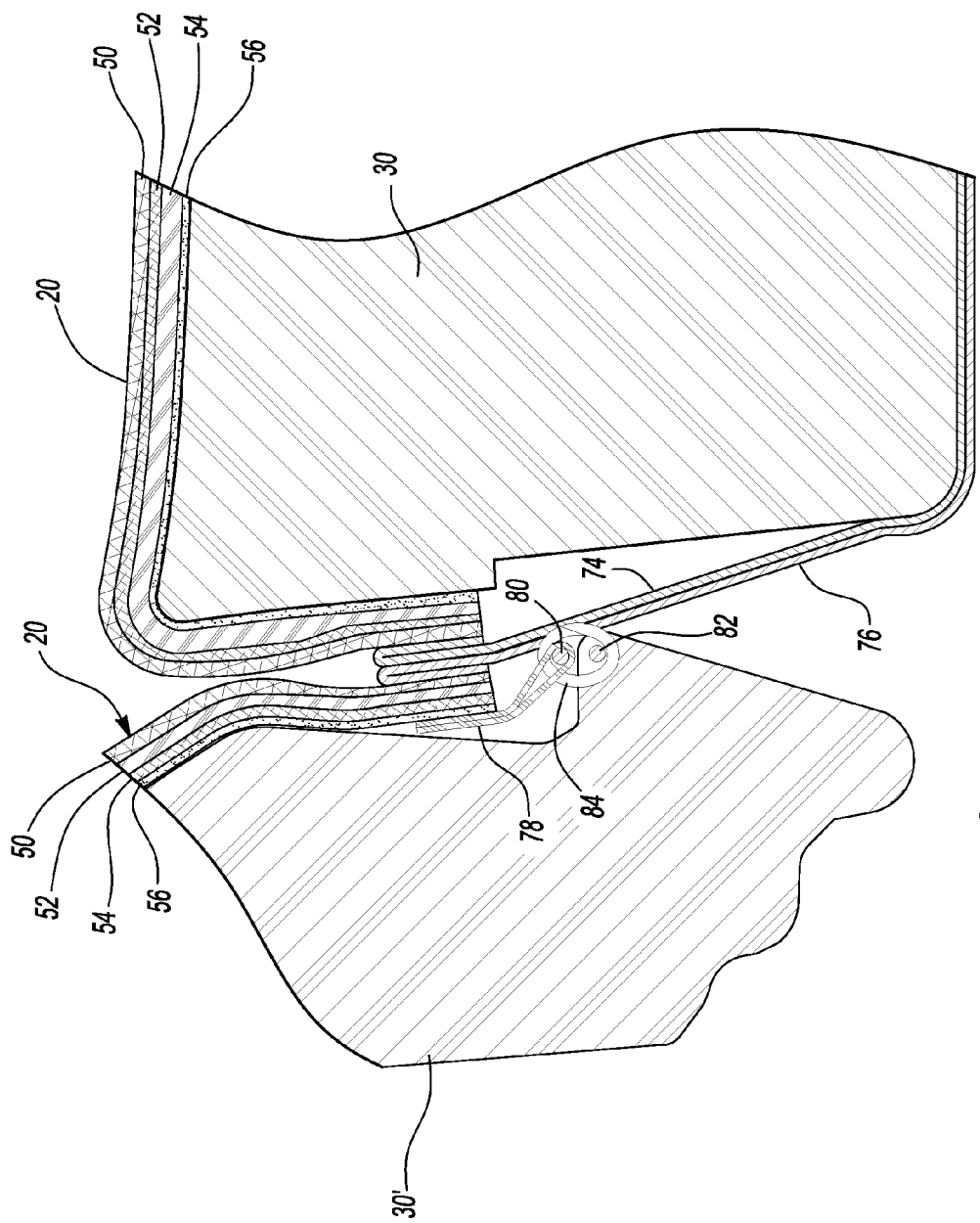
FIG. 6 is a magnified section view of a portion of the seat assembly shown in FIG. 5.

Referring to FIGS. 5 and 6, a first cover assembly 70 and a second cover assembly 72 are shown. The first and/or second cover assemblies 70, 72 may be provided with the seat bottom 12 or another region of the seat assembly 10. In the embodiment shown, the first cover assembly 70 is associated with a main seating area of the seat bottom 12 and the second cover assembly 72 is associated with the side bolsters 16 of the seat bottom 12.

The first cover assembly 70 may include a trim cover assembly 20 and a first sling 74. The first sling 74 may be attached proximate opposing ends of the trim cover assembly 20. For example, the first sling 74 may be positioned in an end-to-end relationship with the trim cover assembly 20 or may overlap any suitable layer of the trim cover assembly 20. In the embodiment shown, the first sling 74 is disposed proximate an exterior surface of the first layer 50. The first sling 74 may be provided in other positions, such as adjacent to the cushion 30 or in direct contact with another layer of the trim cover assembly 20. The first sling 74 may be attached in any suitable manner, such as by heat bonding or fusing, with an adhesive, by mechanical attachment, or combinations thereof.

The first sling 74 may extend around at least a portion of the cushion 30 to provide a tensile force that helps stretch the trim cover assembly 20 to inhibit creasing of the trim cover assembly 20 and/or inhibit permanent improper displacement of the cushion 30. The first sling 74 may be made of any suitable material or materials, such as a fabric, an elastomeric material, or combinations thereof. The first sling 74 may cooperate with the trim cover assembly 20 to provide sufficient tension to help at least a portion of the first cover assembly 70 spring back to an initial condition when a seat occupant is not sitting in the seat assembly 10. In addition, the first sling 74 may exert tension on the first portion 40 in a different direction than the second portion 42.

The second cover assembly 72 may include at least one trim cover assembly 20, a second sling 76, and a retaining feature 78. In the embodiment shown in FIG. 5, a trim cover assembly 20 is provided over each side bolster 16. A first end of each trim cover assembly 20 may be attached to the seat assembly 10 in any suitable manner. For example, the first end may be coupled to the frame 36 as previously discussed. A second end of each trim cover assembly 20 disposed opposite the first end may be disposed proximate the second sling 76. As is best shown in FIG. 6, the second sling 76 may be disposed proximate an exterior surface of the first layer 50. The present invention also contemplates that the second sling 76 may be provided in alternative positions, such as adjacent to the bolster cushion 30', which may be part of cushion 30, or in direct contact with another layer of the trim cover assembly 20. The second sling 76 may be attached in any suitable manner, such as by heat bonding or fusing, with an adhesive, by mechanical attachment, or combinations thereof.

The second sling 76 may extend around at least a portion of the cushion 30 to provide a tensile force that helps stretch one or more trim cover assemblies 20 associated with the bolster 16 to inhibit creasing of the trim cover assembly 20 and/or inhibit permanent improper displacement of the cushion 30. Moreover, the second sling 76 may bias the bolsters 16 toward each other. For instance, the second sling 76 may be biased or stretched by the weight exerted by a seat occupant upon the main seating area, which may then stretch the second sling 76 and bias the second cover assembly 72 and the bolsters 16. In addition, the second sling 76 may exert tension in a different direction than the second portion 42. For instance, tension exerted by the second sling may be generally lateral (side to side) while that exerted by the second portion 42 may be generally longitudinal (front to back) in one or more embodiments.

The second sling 76 may be disposed adjacent to the first sling 74. For instance, the second sling 76 may overlap or may be positioned next to the first sling 74, such as where the slings extend around at least a portion of the cushion 30. The second sling 76 may be made of any suitable material or materials, such as a fabric, an elastomeric material, or combinations thereof.

Referring to FIG. 6, the retaining feature 78 may facilitate attachment of the second cover assembly 72 to the seat assembly 10. The retaining feature 78 may have any suitable configuration. For instance, the retaining feature 78 may be configured as a loop that may engage or be coupled to a first fixation member 80, such as a wire. In at least one embodiment, the first fixation member 80 may be coupled to an second fixation member 82, such as an upholstery wire provided with the cushion 30' via a hook ring 84.

The retaining feature 78 may be provided in any suitable location on the second cover assembly 72. For instance, the retaining feature 78 may be disposed adjacent to or not adjacent to the second sling 76. In the embodiment shown, the retaining feature 78 is disposed proximate the fourth layer 56 and on a side of the second cover assembly 72 disposed opposite the second sling 76. The retaining feature 78 may be coupled to the second cover assembly 72 in any suitable manner, such as with such as by heat bonding or fusing, with an adhesive, by mechanical attachment, or combinations thereof.

Figure 7:
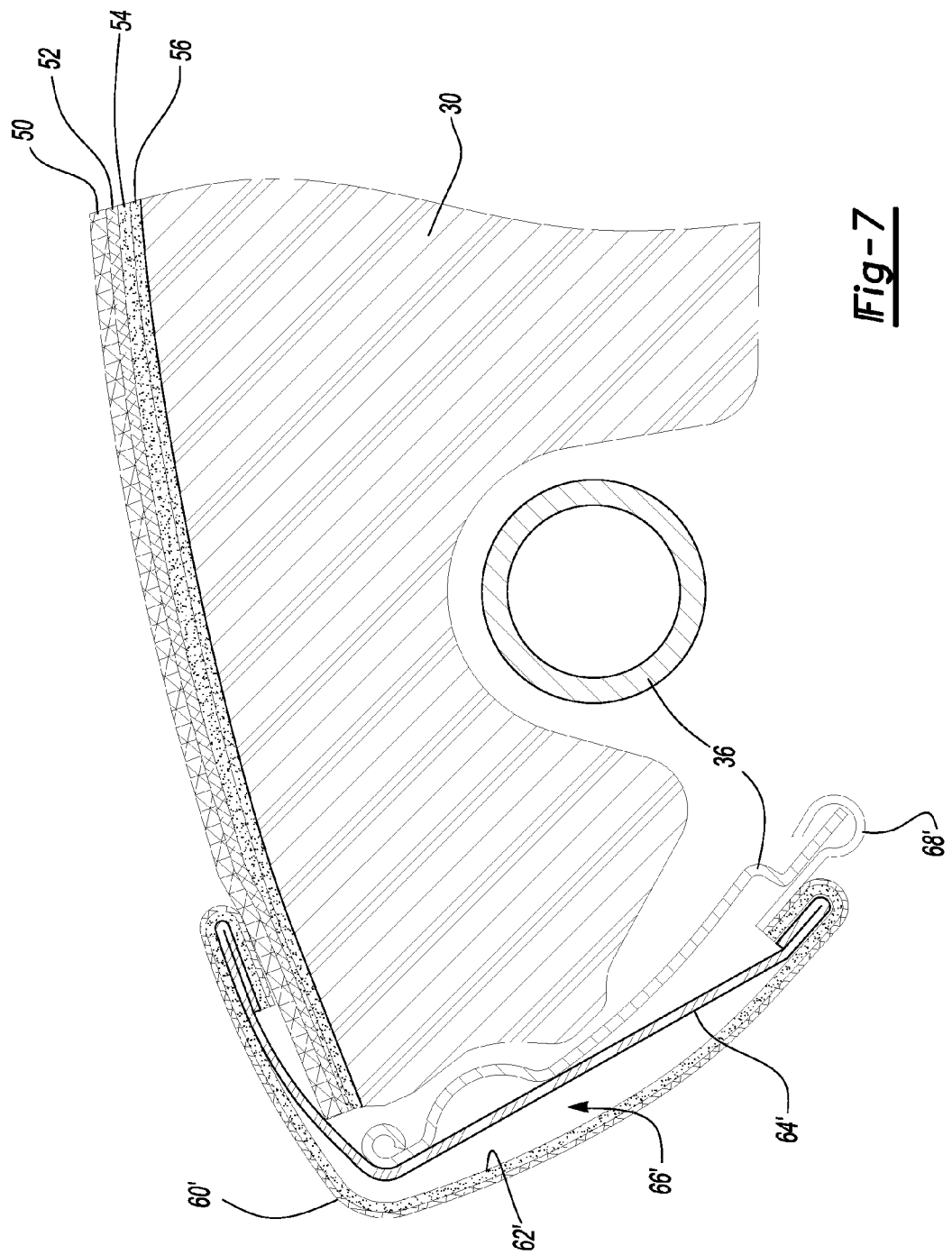
FIG. 7 is a fragmentary section view of the seat assembly along section line 7-7.

Referring to FIG. 7, a section view of a bolster 16 and the second cover assembly 72 is shown. A bolster strap 90 may be provided near a back side of the second cover assembly 72 (i.e., near or under the seat back 14 or near the back of the bolster 16). A bolster strap 90 may be provided with each bolster 16 and facilitate independent bolster movement. The bolster strap 90 may provide tension in a similar direction as the second portion 42. In addition, the bolster strap 90 may provide a different amount of tension than the second portion 42. For instance, the bolster strap 90 may provide less tension than the second portion 42 since the bolsters 16 usually incur lower load forces than the main seating area.

The bolster strap 90 may have a similar configuration to the second portion. For example, the bolster strap 90 may include a plurality of layers, such as a cover layer 60', a backing layer 62', and a tension layer 64'. The cover layer 60', backing layer 62', and tension layer 64' may be similar to the cover layer 60, backing layer 62, and tension layer 64 described above with reference to the second portion 42. As such, a gap 66' may be provided between the tension layer 64' and the cover and/or backing layers 60', 62'. The cover, backing and/or tension layers 60', 62', 64' may be sewn together or not provided as a laminate as they may be subjected to lower load forces and/or less frequent loading than the second portion 42. The bolster strap 90 may include an attachment feature 68' that may be provided proximate an end of the bolster strap 90. The attachment feature 68' may have any suitable configuration and may couple the bolster strap 90 to a portion of the seat assembly 10, such as the frame 36. The attachment feature 68' may be coupled to the bolster strap 90 in any suitable manner, such as with such as by heat bonding or fusing, with an adhesive, by mechanical attachment, or combinations thereof.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
    a frame;
    a cushion disposed proximate the frame; and
    a cover assembly disposed proximate the cushion, the cover assembly including:
        a first portion having a plurality of layers; and
        a second portion having a first end coupled to the first portion and a second end coupled to the frame, the second portion having a cover and an elastomeric layer;
    wherein the elastomeric layer is spaced apart from the cushion and is detached from the cover and engages the frame between the first and second ends.

2. The seat assembly of claim 1 wherein the second portion is disposed proximate a back side of a seat bottom.

3. The seat assembly of claim 1 wherein at least a portion of the elastomeric layer and the cover are spaced apart from each other.

4. The seat assembly of claim 1 further comprising a bolster strap, wherein the bolster strap includes a strap cover layer having a first strap end coupled to the cover assembly, a second strap end coupled to the frame, and an elastomeric strap layer coupled to the strap cover layer proximate the first and second strap ends.

5. The seat assembly of claim 4 wherein the elastomeric strap layer is detached from the strap cover layer between the first and second ends.

6. The seat assembly of claim 4 wherein the elastomeric layer provides a greater tensile force than the elastomeric strap layer.

7. A seat assembly comprising:
    first and second bolster cushions;
    a seat cushion that includes a first surface that faces toward a seat occupant and a second surface disposed opposite the first surface; and
    a cover assembly including:
        a first portion disposed proximate the first surface, the first portion having a first end and a second end disposed opposite the first end; and a sling coupled to the first and second ends of the first portion and disposed proximate the second surface;

wherein the sling extends along the second surface and is disposed between the first bolster cushion and the seat cushion and between the second bolster cushion and the seat cushion and provides a tensile force that stretches the first portion.

8. The seat assembly of claim 7 wherein the first and second bolster cushions are separated from the seat cushion.

9. The seat assembly of claim 7 wherein the seat cushion is provided with a seat bottom configured to support a seat occupant.

10. The seat assembly of claim 7 wherein at least a portion of the sling and the seat cushion are spaced apart from a seat frame.

11. The seat assembly of claim 7 wherein the cover assembly further comprises a second portion coupled to the first portion, wherein the second portion is spaced apart from the sling and includes an elastomeric layer that exerts a tensile force on the first portion in a different direction than the tensile force exerted by the sling.

12. The seat assembly of claim 11 wherein the seat assembly further comprises a frame and wherein the second portion further comprises a cover layer, a first end coupled to the first portion, and a second end coupled to the frame, wherein the elastomeric layer is detached from the cover layer between the first and second ends.

13. The seat assembly of claim 12 wherein the second portion further comprises first and second elastomeric layers, wherein the first and second elastomeric layers are spaced apart from each other and are not fixedly attached to the frame.

14. A seat assembly comprising:
first and second bolster cushions;
a seat cushion disposed between the first and second bolster cushions, the seat cushion having a first side that faces toward a seat occupant and a second side disposed opposite the first side; and
a bolster cover assembly including a first bolster trim cover disposed on the first bolster cushion, a second bolster trim cover disposed on the second bolster cushion and spaced apart from the first bolster trim cover, and a bolster sling coupled to the first and second bolster trim covers;
wherein the bolster sling is disposed between the first bolster cushion and the seat cushion and between the second bolster cushion and the seat cushion and extends along the second side, wherein the bolster sling biases the first and second bolster trim covers toward each other in response to a sufficient load force.

15. The seat assembly of claim 14 wherein the first and second bolster trim covers are spaced apart from the seat cushion.

16. The seat assembly of claim 15 further comprising a first cover assembly disposed on the seat cushion, the first cover assembly including a first trim cover disposed on a first side of the seat cushion and a first sling disposed on a second side of the seat cushion disposed opposite the first side.

17. The seat assembly of claim 16 wherein the first sling and the bolster sling are disposed adjacent to each other.

18. The seat assembly of claim 16 wherein the first sling is disposed between the bolster sling and the seat cushion.

19. The seat assembly of claim 16 further comprising a frame, wherein the first sling and the bolster sling extend substantially parallel to each other.

20. The seat assembly of claim 15 wherein the first and second bolster cushions are part of the seat cushion.

* * * * *